United States Patent
Torii et al.

(10) Patent No.: US 9,902,399 B2
(45) Date of Patent: Feb. 27, 2018

(54) VEHICLE TRAVELLING CONTROL DEVICE FOR CONTROLLING A VEHICLE IN TRAFFIC

(71) Applicant: TOYOTA JIDOSHA KABUSHIKI KAISHA, Toyota-shi, Aichi (JP)

(72) Inventors: Haruto Torii, Toyota (JP); Ryuta Hashimoto, Susono (JP); Tetsuya Taira, Nisshin (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 83 days.

(21) Appl. No.: 14/979,746

(22) Filed: Dec. 28, 2015

(65) Prior Publication Data

US 2016/0194003 A1 Jul. 7, 2016

(30) Foreign Application Priority Data

Jan. 7, 2015 (JP) ................................. 2015-001472

(51) Int. Cl.
*B60W 30/16* (2012.01)
*B60W 10/20* (2006.01)
(Continued)

(52) U.S. Cl.
CPC ............ *B60W 30/16* (2013.01); *B60W 30/12* (2013.01); *B60W 50/14* (2013.01);
(Continued)

(58) Field of Classification Search
CPC ...... B60W 30/16; B60W 10/18; B60W 10/04; B60W 10/30; B60W 10/20;
(Continued)

(56) References Cited

U.S. PATENT DOCUMENTS 6,665,603 B2 * 12/2003 Jindo ................. B60K 31/0008
180/170
8,423,250 B2 * 4/2013 Kondou ................ B60W 10/18
701/53
(Continued)

FOREIGN PATENT DOCUMENTS

JP 2006-44591 A 2/2006
JP 2006-176062 A 7/2006

*Primary Examiner* — Jerrah Edwards
*Assistant Examiner* — Majdi Alsomiri
(74) *Attorney, Agent, or Firm* — Sughrue Mion, PLLC

(57) ABSTRACT

A vehicle travelling control device is configured to cause a vehicle to automatically travel along the target lateral position set in a travelling lane in advance. The device includes a peripheral information detection unit configured to detect peripheral information of the vehicle, a preceding vehicle recognition unit configured to recognize a position of the preceding vehicle in an adjacent lane which is adjacent to the travelling lane based on the peripheral information detection unit, and a travel control unit configured to cause the vehicle to automatically travel along a separated lateral position which is separated from the target lateral position at the opposite side of the adjacent lane side in a case where a lost duration that is a continuous period of time during which the position of the preceding vehicle is lost in the preceding vehicle recognition unit reaches a first predetermined time.

3 Claims, 8 Drawing Sheets

(51) Int. Cl.
  *B60W 10/18* (2012.01)
  *B60W 10/04* (2006.01)
  *G05D 1/00* (2006.01)
  *B60W 10/30* (2006.01)
  *B60W 50/14* (2012.01)
  *B60W 30/12* (2006.01)

(52) U.S. Cl.
  CPC . *B60W 2550/302* (2013.01); *B60W 2550/306* (2013.01); *B60W 2550/308* (2013.01)

(58) Field of Classification Search
  CPC ....... B60W 2550/302; B60W 2710/20; B60W 2710/18; B60W 2710/30; B60W 2550/308; B60W 2720/10; G05D 1/0088
  See application file for complete search history.

(56) References Cited

U.S. PATENT DOCUMENTS

| | | | | |
|---|---|---|---|---|
| 9,403,555 | B2* | 8/2016 | Ueda | B60W 30/165 |
| 9,623,905 | B2* | 4/2017 | Shashua | B62D 15/025 |
| 2005/0125153 | A1* | 6/2005 | Matsumoto | B60T 8/17557 |
| | | | | 701/300 |
| 2009/0125204 | A1* | 5/2009 | Kudo | B62D 15/026 |
| | | | | 701/96 |
| 2009/0216405 | A1* | 8/2009 | Kudo | B62D 15/025 |
| | | | | 701/41 |
| 2015/0360684 | A1* | 12/2015 | Matsuno | B60W 30/00 |
| | | | | 701/23 |
| 2015/0360721 | A1* | 12/2015 | Matsuno | B62D 15/0255 |
| | | | | 701/41 |

\* cited by examiner

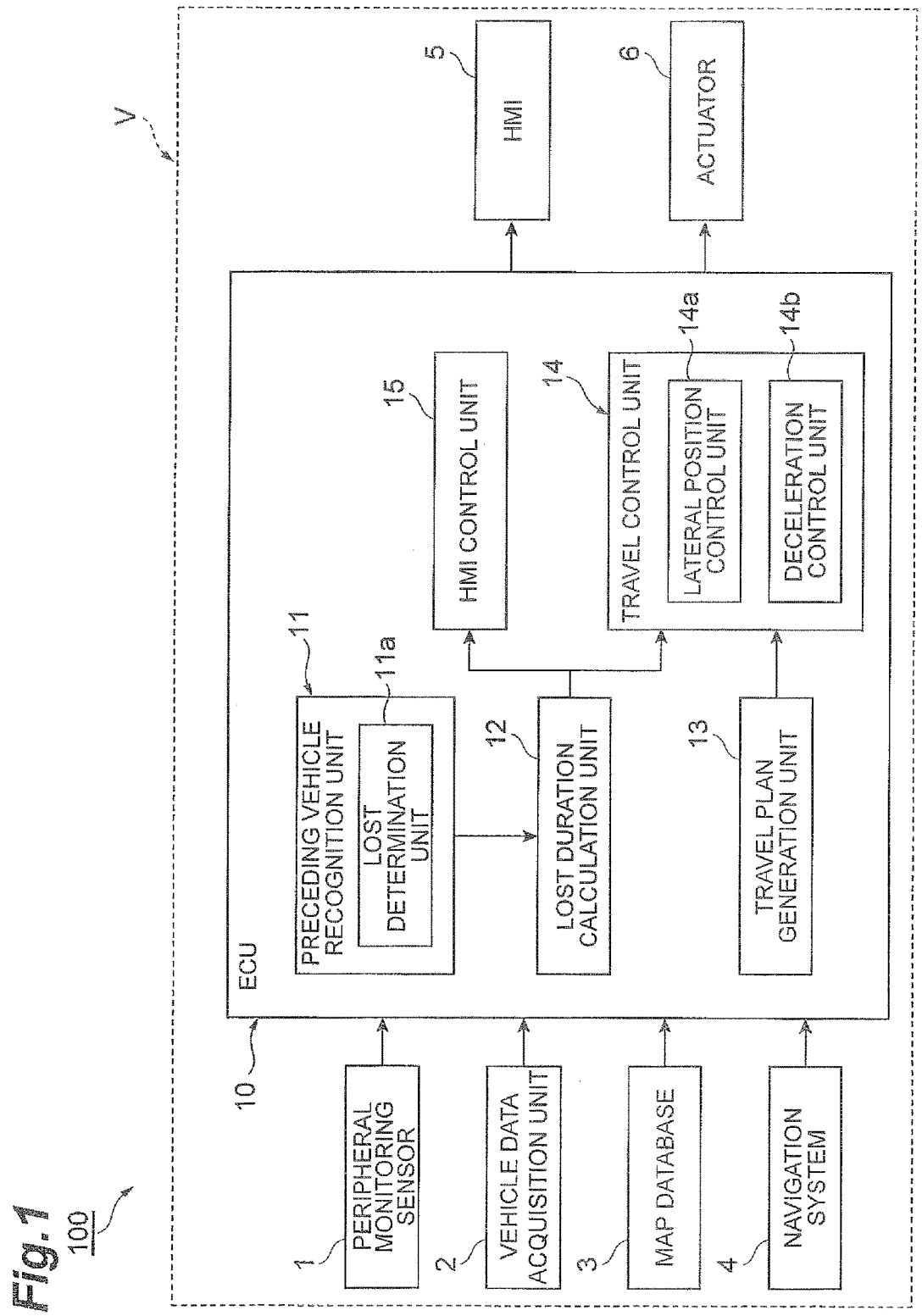

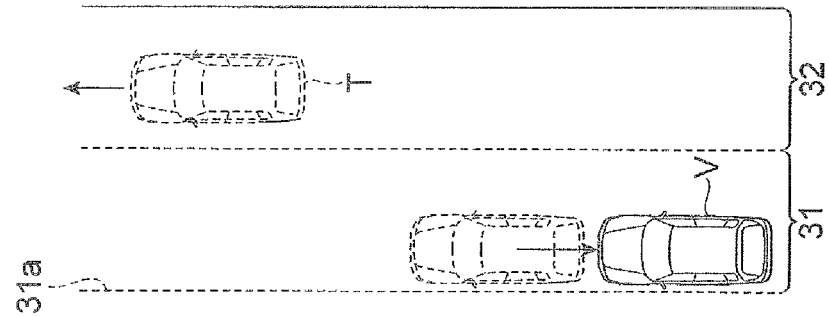
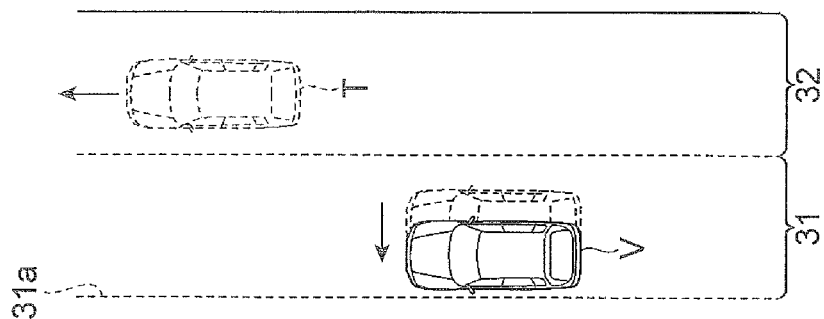

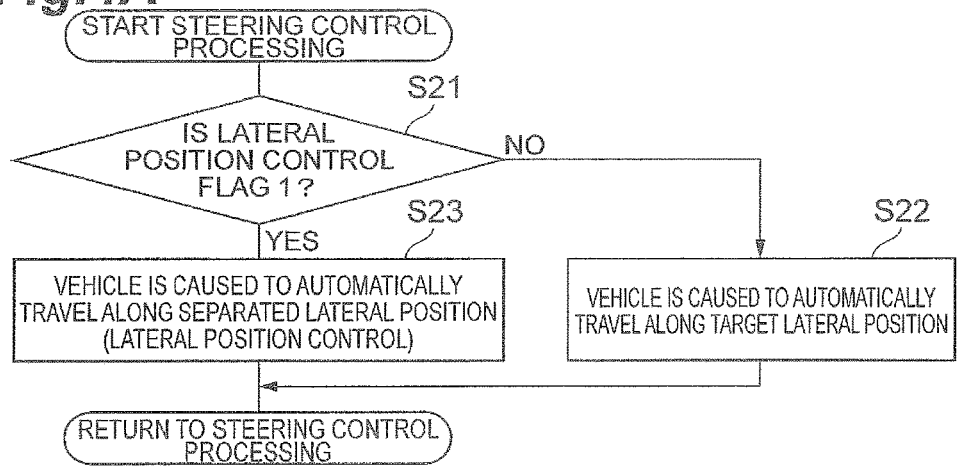
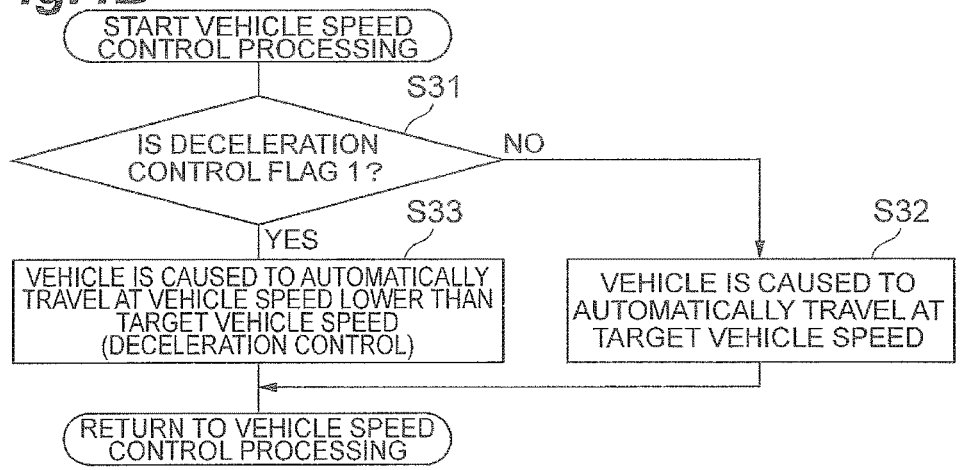
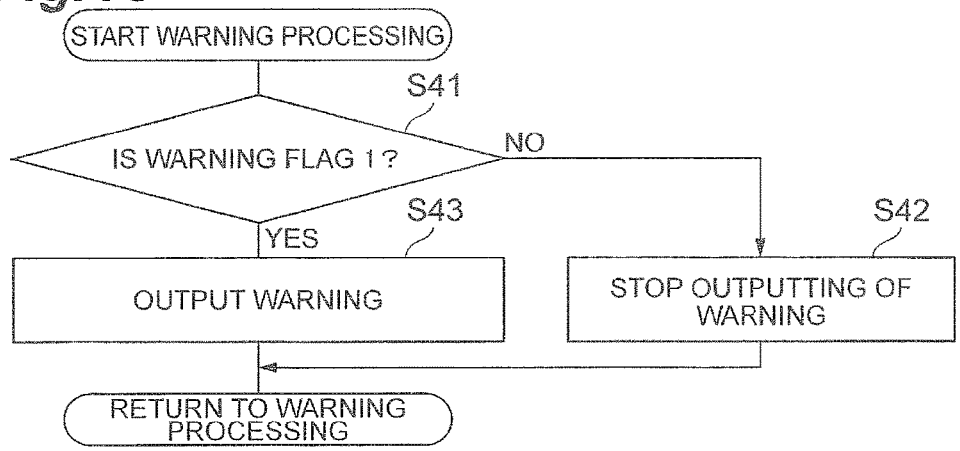

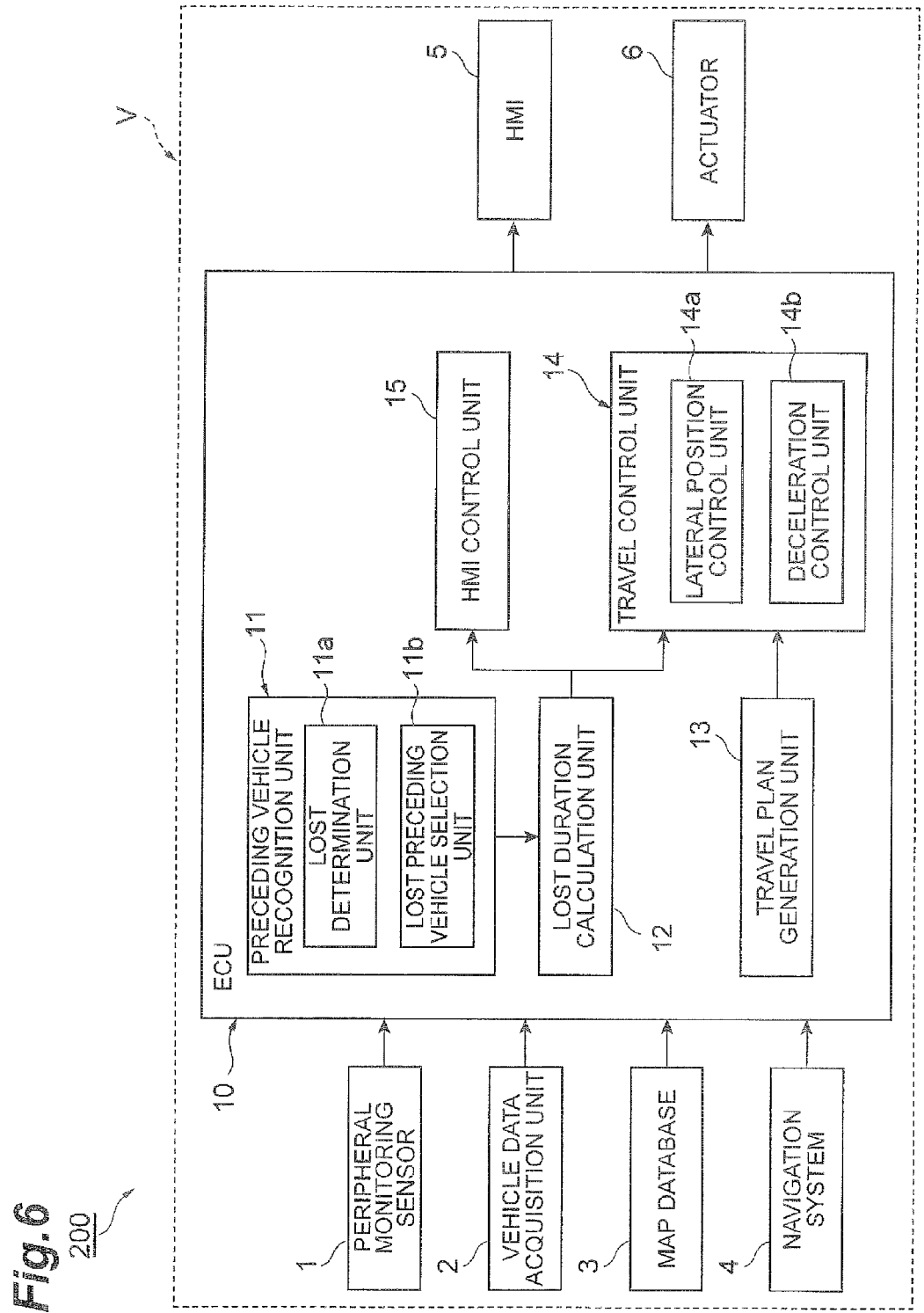

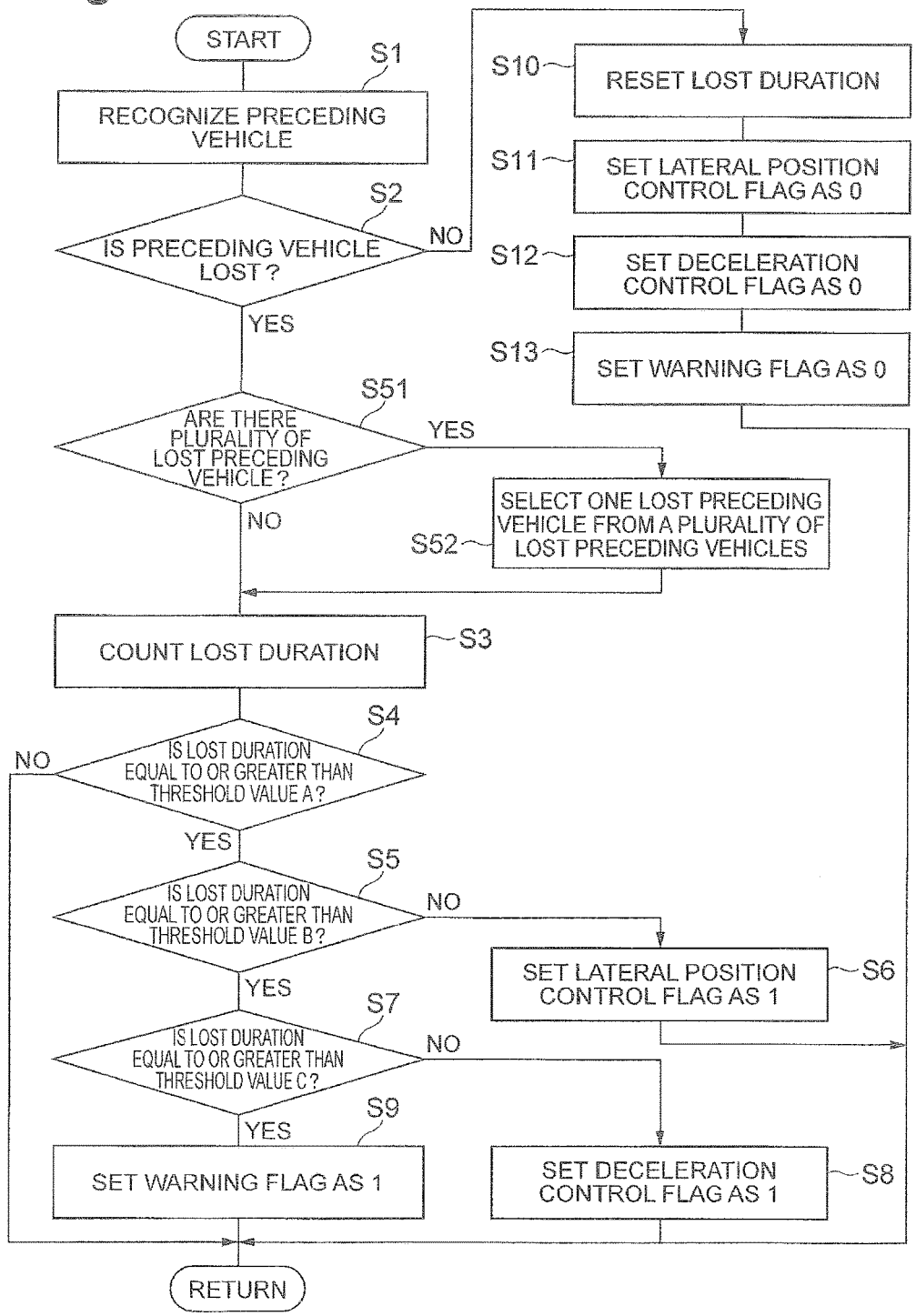

VEHICLE TRAVELLING CONTROL DEVICE FOR CONTROLLING A VEHICLE IN TRAFFIC

BACKGROUND OF THE INVENTION

Field of the Invention

The present invention relates to a vehicle travelling control device.

Related Background Art

As a technology relating to a vehicle travelling control device in the related art, as disclosed in Japanese Unexamined Patent Application Publication No. 2006-44591, a deceleration control device is known, in which it is determined whether or not a preceding vehicle is lost (a driver loses sight of the preceding vehicle), and when it is determined that the preceding vehicle is lost, then, causes a vehicle to decelerate.

SUMMARY

In the related technology described above, by decelerating a vehicle when the position of the preceding vehicle is lost as described above, it can be achieved that the distance to the preceding vehicle is maintained and the possibility of a collision with the preceding vehicle can be decreased. However, in this case, since the vehicle is decelerated when the preceding vehicle is lost, it may cause traffic congestion, and thus, there is room for improvement in this respect.

An object of the present invention is to provide a vehicle travelling control device in which the possibility of a collision with the preceding vehicle can be decreased and the possibility of causing traffic congestion can be decreased.

According to the present invention, there is provided a vehicle travelling control device configured to cause a vehicle to automatically travel along the target lateral position set in a travelling lane in advance, the device including a peripheral information detection unit configured to detect peripheral information of the vehicle, a preceding vehicle recognition unit configured to recognize a position of the preceding vehicle in an adjacent lane which is adjacent to the travelling lane, and a travel control unit configured to cause the vehicle to automatically travel along a separated lateral position which is separated from the target lateral position at the opposite side of the adjacent lane side in a case where a lost duration that is a continuous period of time during which the position of the preceding vehicle is lost in the preceding vehicle recognition unit reaches a first predetermined time.

In the vehicle travelling control device, in a case where a lost duration that is a continuous period of time during which the position of the preceding vehicle on the adjacent lane is lost, during the automatic travelling of the vehicle, reaches the first predetermined time, the lateral position of the vehicle moves to the opposite side of the adjacent lane side. Therefore, it is possible to decrease the possibility of a collision with the preceding vehicle. The movement of the lateral position can be realized without decelerating the vehicle. Therefore, it is possible to decrease the possibility of causing the traffic congestion.

In a case where the lost duration reaches a second predetermined time which is longer than the first predetermined time during the automatic travelling of the vehicle, the vehicle travelling control device may further include a warning unit configured to output a warning to a driver of the vehicle to switch a travelling mode from the automatic travelling to manual travelling. In a case where the lost duration reaches the second predetermined time, it is possible to give the warning to the driver to switch the travelling mode from the automatic travelling to the manual travelling.

BRIEF DESCRIPTION OF THE DRAWINGS

FIG. 1 is a block diagram illustrating a configuration of a vehicle travelling control device in a first embodiment.

FIG. 2A is an overhead view explaining a lateral position control of the vehicle travelling control device illustrated in FIG. 1. FIG. 2B is an overhead view explaining a deceleration control in the vehicle travelling control device illustrated in FIG. 1.

FIG. 4A is a flowchart illustrating steering control processing in an ECU of the vehicle travelling control device illustrated in FIG. 1. FIG. 4B is a flowchart illustrating vehicle speed control processing in an ECU of the vehicle travelling control device illustrated in FIG. 1. FIG. 4C is flowchart illustrating warning processing in an ECU of the vehicle travelling control device illustrated in FIG. 1.

FIG. 6 is a block diagram illustrating a configuration of a vehicle travelling control device in a second embodiment.

FIG. 8 is a flowchart illustrating processing in an ECU of the vehicle travelling control device illustrated in FIG. 6.

DESCRIPTION OF THE PREFERRED EMBODIMENTS

Hereinafter, embodiments of the present invention will be described in detail with reference to the drawings. In the description below, the same reference signs will be given to the same or corresponding elements and the description thereof will not be repeated.

First Embodiment

Figure 3A:
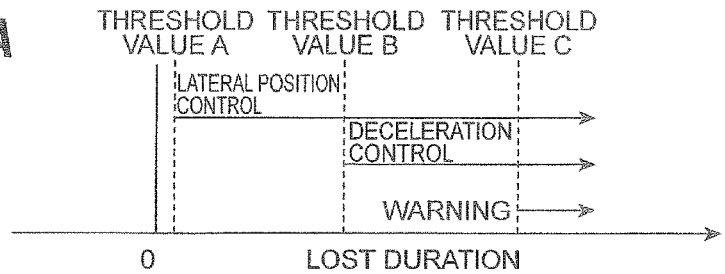
FIG. 3A is a diagram explaining a threshold value of the vehicle travelling control device illustrated in FIG. 1.

FIG. 1 is a block diagram illustrating a configuration of a vehicle travelling control device 100. FIG. 2A is an overhead view explaining a lateral position control of the vehicle travelling control device 100. FIG. 2B is an overhead view explaining a deceleration in the vehicle travelling control device 100. FIG. 3A is a diagram explaining a threshold value of the vehicle travelling control device 100.

As illustrated in FIG. 1, FIG. 2A, and FIG. 2B, the vehicle travelling control device 100 is mounted on a vehicle V such as a vehicle. The vehicle travelling control device 100 causes the vehicle V to automatically travel (automatic driving) on the travelling lane 31 on which the vehicle V travels. The vehicle travelling control device 100 includes a peripheral monitoring sensor (peripheral information detection unit) 1, a vehicle data acquisition unit 2, a map database 3, a navigation system 4, a human machine interface (HMI) 5, an actuator 6, and an electronic control unit (ECU) 10.

The peripheral monitoring sensor 1 is a detection device configured to detect peripheral information of the vehicle V. The peripheral monitoring sensor 1 includes at least one of a camera, radar, and a laser imaging detection and ranging (LIDAR). The camera is an imaging device configured to image the external situation of the vehicle V. The camera is, for example, provided on the inside of front windshield of the vehicle V. The camera transmits the information on the external situation of the vehicle V to the ECU 10. The camera may be monocular camera image or may be a stereo camera. The stereo camera has two imaging units that are arranged so as to reproduce a binocular parallax.

The radar detects an obstacle outside of the vehicle V using a radio wave (for example, a millimeter wave). The radar detects the obstacle by transmitting the radio wave to the surroundings of the vehicle V and receiving the wave reflected from the obstacle. The radar transmits detected obstacle information to the ECU 10. The LIDAR detects the obstacle outside the vehicle V using light. The LIDAR transmits the light to the surroundings of the vehicle V, measures the distance to the reflection point by receiving the light reflected from the obstacle, and then, detects the obstacle. The LIDAR transmits the detected obstacle information to the ECU 10. The camera, the LIDAR, and the radar as the peripheral monitoring sensor 1 are not necessarily provided in an overlapping manner.

The vehicle data acquisition unit 2 is a detection device configured to detect vehicle data which is a traveling state of the vehicle V. The vehicle data acquisition unit 2 includes a vehicle speed sensor, an acceleration sensor, and a yaw rate sensor. The vehicle speed sensor is detection device configured to detect the speed of the vehicle V. As the vehicle speed sensor, for example, a vehicle wheel speed sensor is used, which is provided with respect to vehicle wheels of the vehicle V or a drive shaft rotating integrally with the vehicle wheels and detects the rotation speed of the vehicle wheels. The vehicle speed sensor transmits the detected vehicle speed information (vehicle wheel speed information) to the ECU 10.

The acceleration sensor is a detection device configured to detect an acceleration of the vehicle V. The acceleration sensor includes, for example, a longitudinal acceleration sensor that detects acceleration in the front and rear direction of the vehicle and a lateral acceleration sensor that detects a lateral acceleration of the vehicle V. The acceleration sensor transmits, for example, acceleration information to the ECU 10. The yaw rate sensor is a detection device of the vehicle V configured to detect a yaw around the vertical axis of the center of the gravity of the vehicle V (rotation angular velocity). As the yaw rate sensor, for example, a Gyro sensor can be used. The yaw rate sensor transmits detected yaw rate information of the vehicle V to the ECU 10.

The map database 3 is a database in which map information is included. The map database 3 is formed, for example, in a hard disk drive (HDD) mounted on the vehicle. In the map information, for example, position information of the road, information of the road type (for example, type of a curve or a straight portion or a curvature of the curve), position information of the intersection and the branch point are included. In the map database 3, the map information may include an output signal of the peripheral monitoring sensor 1 in order to use the position information of a shielding structure of the such as a building or a wall and the simultaneous localization and mapping technology (SLAM). The map database 3 may be stored in a computer in the facility such as an information processing center which is capable of communicating with vehicle V.

The navigation system 4 is a device configured to perform guidance to a destination set by a driver of the vehicle V on a driver of the vehicle V. The navigation system 4 calculates a travelling route of the vehicle V based on, for example, the position information of the vehicle V measured using the global positioning system (GPS) and the map information in the map database 3. The route may be a specific lane suitable for driving in a multi-lane section. The navigation system 4 calculates, for example, a target route from the position of the vehicle V to the destination and performs the notification to the driver by a displaying or a voice output of a speaker. The navigation system 4, for example, transmits the target route information of the vehicle V to the ECU 10. The navigation system 4 may be stored in a computer in the facility such as an information processing center which is capable of communicating with vehicle V.

The HMI 5 is an interface configured to perform an input and output of the information between the occupants (including the driver) of the vehicle V and the vehicle travelling control device 100. The HMI 5 includes, for example, a display panel for displaying the image information for the occupant, a speaker for the voice output, and an operation button or a touch panel for the occupant to perform the input operation. When an operation to operate or to stop the automatic travelling is input by the occupant, the HMI 5 starts or stops the automatic travelling by outputting a signal to the ECU 10. The HMI 5 may perform the outputting of the information to the occupant using a wireless-connected mobile information terminal or may receive the input operation by the occupant using the mobile information terminal.

In addition, the HMI 5 functions as a warning unit. The HMI 5 outputs a warning for switching a travelling mode from the automatic travelling to a manual travelling (manual driving) by the driver of the vehicle V according to a control signal from the ECU 10. The warning output from the HMI 5 is a reminder to the driver of switching to the manual travelling. For example, the HMI 5 outputs a warning to prompt an input operation by the driver or a warning indicating a time delay until switching to the manual travelling starts. For example, the HMI 5 outputs a warning to prompt the driver to return the lateral position of the vehicle V to the center of the travelling lane 31 in the lane width direction. The image displayed on the display panel and a sound such as an alarm or a voice output from the speaker can be examples of the warning.

The actuator 6 is a device configured to perform a travel control of the vehicle V. The actuator 6 includes at least a throttle actuator, a brake actuator, and a steering actuator. The throttle actuator controls a supply amount (throttle opening degree) of air to an engine according to the control signal from the ECU 10, and controls the driving force of the vehicle V. In a case where the vehicle V is a hybrid vehicle or an electric vehicle, the throttle actuator is not included and the driving force is controlled by the control signal input to a motor as a source of the driving force from the ECU 10.

The brake actuator controls a brake system according to the control signal from the ECU 10 and controls the braking force given to the wheels of the vehicle V. For example, a hydraulic brake system can be used as the brake actuator. The steering actuator controls the driving of an assist motor that controls steering torque in the electric power steering system according to the control signal from the ECU 10. In this way, the steering actuator controls the steering torque of the vehicle V.

The ECU 10 is an electronic control unit including a central processing unit (CPU), read only memory (ROM), random access memory (RAM), and the like. In the ECU 10, various controls are performed by loading the program stored in the ROM into the RAM and executing the program by the CPU. The ECU 10 may be configured with a plurality of electronic control units.

The ECU 10 includes, for example, a preceding vehicle recognition unit 11, a lost duration calculation unit 12, a travel plan generation unit 13, a travel control unit 14, and an HMI control unit 15. The preceding vehicle recognition unit 11 recognizes the position of a preceding vehicle T on an adjacent lane 32 which is adjacent to the travelling lane 31 on which the vehicle V is travelling, based on the detection result of the peripheral monitoring sensor 1. For example, the preceding vehicle recognition unit 11 recognizes the position of another vehicle existing in front of the vehicle V, recognizes white lines on both sides of the adjacent lane 32, and in a case where another vehicle exists in the white line, recognizes that the position of the other vehicle as the position of the preceding vehicle T on the adjacent lane 32. In addition, the preceding vehicle recognition unit 11 recognizes a vehicle speed, acceleration and a travelling direction of the preceding vehicle T based on the detection result of the peripheral monitoring sensor 1. The recognition of the preceding vehicle T by the preceding vehicle recognition unit 11 is, for example, performed for every predetermined period of time. A method of recognizing the preceding vehicle T by the preceding vehicle recognition unit 11 is not particularly limited, and thus, a known method can be used. The preceding vehicle recognition unit 11 includes a lost determination unit 11a.

The lost determination unit 11a determines whether or not the recognized position of the preceding vehicle T is lost (whether or not the position of the preceding vehicle T is not in sight). In a case where the position of the preceding vehicle T is lost, the lost determination unit 11a outputs a lost signal to the lost duration calculation unit 12. The lost determination unit 11a outputs the position, vehicle speed, acceleration, and travelling direction of the preceding vehicle T immediately before the lost, to the travel control unit 14.

The lost means the state of losing the position of the preceding vehicle T due to an abnormality in the peripheral monitoring sensor 1 (a deterioration of the accuracy in the detection result, an erroneous detection, or the detection itself is disabled). In the lost, a case of losing the position of the preceding vehicle T caused by the preceding vehicle T travelling outside the detection range of the peripheral monitoring sensor 1 is not included. As examples of the lost situation, there are cases where: the light reception portion of the peripheral monitoring sensor 1 (the camera lens or the reception unit of the LIDAR) are existing under the backlight, the vehicle V is travelling the entrance or exit of a tunnel, dirt is attached to the detection unit of the peripheral monitoring sensor 1 (the camera lens or the reception unit of the laser or the LIDAR), and the weather is rainy or snowy.

For example, the lost determination unit 11a performs the lost determination in the following manner. That is, the lost determination unit 11a determines whether or not the position of the preceding vehicle T recognized in the previous recognition period is not recognized in the current recognition period. In a case where the position of the preceding vehicle T is continuously recognized, it is determined that the position of the preceding vehicle T is not lost and the lost signal is not output.

In a case where there exists the preceding vehicle T of which the position is not recognized in the current recognition period, the lost determination unit 11a determines whether or not the preceding vehicle T is predicted to be within the detection range of the peripheral monitoring sensor 1. Specifically, the lost determination unit 11a determines whether or not the preceding vehicle T is predicted to be within the detection range of the peripheral monitoring sensor 1 at the current recognition time from the vehicle speed, the acceleration, and the travelling direction of the preceding vehicle T at the previous recognition time. In a case where the not-recognized preceding vehicle T is not predicted to be within the detection range of the peripheral monitoring sensor 1 at the current recognition time, it is determined that the position of the preceding vehicle T is not lost (it is a normal lost) and the lost signal is not output.

On the other hand, in a case where the unrecognized preceding vehicle T is predicted to be within the detection range of the peripheral monitoring sensor 1 at the current recognition time, it is determined that the position of the preceding vehicle T is lost and the lost signal is output to the lost duration calculation unit 12. The detection range of the peripheral monitoring sensor 1 is set in advance and stored in the lost determination unit 11a. A method of lost determination is not particularly limited, and thus, a known method can be used.

The lost duration calculation unit 12 calculates the lost duration that is a continuous period of time during which the position of the preceding vehicle T is lost. The lost duration calculation unit 12 calculates the lost duration by measuring the time in which the lost signal is continuously output from the lost determination unit 11a.

In a case where the lost duration reaches a threshold value A (a first predetermined time, refer to FIG. 3A), the lost duration calculation unit 12 sets a lateral position control flag which is a flag of starting the lateral position control described below as 1, and outputs the lateral position control flag to the travel control unit 14. In a case where the lost duration reaches a threshold value B (refer to FIG. 3A), the lost duration calculation unit 12 sets a deceleration control flag which is a flag of starting the deceleration control described below as 1, and outputs the deceleration control flag to the travel control unit 14.

In a case where the lost duration reaches a threshold value C (a second predetermined time, refer to FIG. 3A), the lost duration calculation unit 12 sets a warning flag which is a flag of starting the warning described below as 1, and outputs the warning flag to the HMI control unit 15. The threshold value C is greater than the threshold value B and the threshold value B is greater than the threshold value A. The threshold values A to C are set in advance and stored. The threshold value A is a time, for example, necessary for readjusting the sensitivity of the peripheral monitoring sensor 1 at the exit or the entrance of a tunnel. The threshold value B is a time, for example, calculated from a relative speed with the preceding vehicle T and is the time necessary for the vehicle V to overtake the preceding vehicle T. The threshold value C is calculated from the current vehicle speed of the vehicle V or the automatic driving duration of the vehicle V. In a case where the automatic driving target route duration is long, the threshold value C may be set to be short because the driver becomes careless.

In a case where the lost signal is not output from the lost determination unit 11a, the lost duration calculation unit 12 resets the measured lost duration to be 0. In a case where the lost signal is not output from the lost determination unit 11a, the lost duration calculation unit 12 resets the lateral position control flag to be 0 and resets the deceleration control flag to be 0, and outputs the lateral position control flag and the deceleration control flag to the travel control unit 14. In a case where the lost signal is not output from the lost determination unit 11a, the lost duration calculation unit 12 resets the warning flag to be 0 and outputs the warning flag to the HMI control unit 15.

The travel plan generation unit 13 generates a path of the vehicle V based on, for example, the target route and the position information of the vehicle V from the navigation system 4 and the peripheral information from the peripheral monitoring sensor 1. The path is a trajectory in which the vehicle V travels on the travelling lane 31 along the target route. The travel plan generation unit 13 generates the path such that the vehicle V can suitably travel on the target route in view of the standards such as safety, legal compliance, and travelling efficiency. In the path, a target lateral position in the travelling lane 31 is set in advance. The target lateral position is a position in the travelling lane 31 in the lane width direction on which the vehicle V is subject to travel. The target lateral position is not particularly limited, but is a position at the center of the travelling lane 31 in the lane width direction.

The travel plan generation unit 13 may generate the path of the vehicle V such that contact with obstacle can be avoided based on the situation of the obstacle around the vehicle V. When a destination is not explicitly set by the driver, the travelling route automatically generated based on the peripheral information and the map information is included in the target route.

The travel plan generation unit 13 generates a travel plan according to the generated path. The travel plan generation unit 13 outputs the generated travel plan as a set of two elements such as a target position p on the coordinate system in which the path of the vehicle V is fixed to the vehicle V and a vehicle speed v at each target point, that is, the set having a plurality of configuration coordinates (p, v). Each target position p has information on the position (x, y) in the coordinates system in which at least the path is fixed to the vehicle V, or the information equivalent thereto. The travel plan is not limited in particular, as long as the behavior of the vehicle V is discernible. In the travel plan, for example, a target time t may be used instead of the vehicle speed v, or the direction of the vehicle V at the point in target time t may be added.

Usually, future data of approximately a few second later than the current time is sufficient as the travel plan. However, data of several tens of seconds may be needed depending on the situations such as a right turn at an intersection or the overtaking of the vehicle V. Therefore, it is preferable that the number of configuration coordinates of the travel plan is variable, and the distance between the configuration coordinates is variable. Furthermore, a curved line connecting the configuration coordinates is approximated by the spline function, and then, the parameters of the curved line may be the data of the travel plan. Any arbitrary known method can be used in the generation of the travel plan as long as the behavior of the vehicle V can be marked.

In the present embodiment, the travel plan includes a standard speed pattern indicating the trend of the vehicle speed of the vehicle V and a standard steering pattern indicating the trend of the steering torque when the vehicle V travels on the path along the target route. The standard speed pattern and the standard steering pattern are the data set in association with the time for each control position with respect to the control position set in a predetermined interval (for example, 1 m) on the path. The standard speed pattern is vehicle speed data causing the vehicle V to automatically travel in a target vehicle speed set in advance. The target vehicle speed is the vehicle speed at which the vehicle V can suitably travel on the target route in view of standards such as safety, legal compliance, and travelling efficiency. The standard steering pattern is the steering torque data causing the vehicle V to automatically travel along the target lateral position on the path.

The travel control unit 14 automatically controls the travel of the vehicle V based on the travel plan generated in the travel plan generation unit 13. The travel control unit 14 outputs the control signal corresponding to the travel plan to the actuator 6. The travel control unit 14 controls the actuator 6 based on the standard steering pattern, and causes the vehicle V to automatically travel along the target lateral position. The travel control unit 14 controls the actuator 6 based on the standard speed pattern, and causes the vehicle V to automatically travel at the target vehicle speed.

The travel control unit 14 includes a lateral position control unit 14a and a deceleration control unit 14b. In a case where the lateral position control flag output from the lost duration calculation unit 12 is 1 (that is, in a case where the lost duration reaches the threshold value A), the lateral position control unit 14a performs a lateral position control for causing the vehicle V to automatically travel along a separated lateral position which is separated from the target lateral position to the opposite side of the adjacent lane 32 side as illustrated in FIG. 2A.

For example, following processing is executed in the lateral position control. That is, the steering pattern at the separated lateral position is generated based on the standard steering pattern, the detection result of the peripheral monitoring sensor 1 and the recognition result (the position of the preceding vehicle T immediately before the lost) of the preceding vehicle recognition unit 11. The steering pattern at the separated lateral position is steering torque data for causing the lateral position of the vehicle V to move from the target lateral position to the separated lateral position (lateral movement) and for causing the vehicle V to travel along the separated lateral position. The separated lateral position is a lateral position in the travelling lane 31, which is separated from the target lateral position to the lane side opposite to the adjacent lane 32 on which the preceding vehicle T travels. Here, a white line 31a at the opposite side of the adjacent lane 32 is recognized, and then, the lateral position on the white line 31a in the travelling lane 31 on which side surface of the vehicle V positions is the separated lateral position. Then, the actuator 6 is controlled based on the steering pattern at the separated lateral position instead of the standard steering pattern, and the vehicle V is caused to automatically travel along the separated lateral position.

In a case where the deceleration control flag output from the lost duration calculation unit 12 is 1 (that is, in a case where the lost duration reaches the threshold value B), the deceleration control unit 14b performs a deceleration control (vertical position control) for causing the vehicle V to automatically travel at a vehicle speed which is decelerated from the target vehicle speed such that the distance between the vehicle V and the lost preceding vehicle T is enlarged as illustrated in FIG. 2A.

For example, following processing is executed in the deceleration control. That is, a decelerated vehicle speed pattern is generated based on a standard vehicle speed pattern and the recognition result (the vehicle speed, the acceleration, and the travelling direction of the preceding vehicle T immediately before the lost) of the preceding vehicle recognition unit 11. The decelerated vehicle speed pattern is the vehicle speed data that causes the vehicle V to decelerate (vertical movement) until the preceding vehicle T positions again at the distant position within the detection range of the peripheral monitoring sensor 1, and then, to maintain the decelerated vehicle speed. Then, the actuator 6 is controlled based on the decelerated vehicle speed pattern instead of the standard speed pattern, and the vehicle V is caused to automatically travel at the vehicle speed decelerated from the target vehicle speed.

In a case where the warning flag output from the lost duration calculation unit 12 is 1 (that is, in a case where the lost duration reaches the threshold value C), the HMI control unit 15 controls the HMI 5 and outputs the warning from the HMI 5.

Next, the processing tasks executed in the vehicle travelling control device 100 will be described with reference to the flowchart in FIG. 3B and FIGS. 4A to 4C.

Figure 3B:
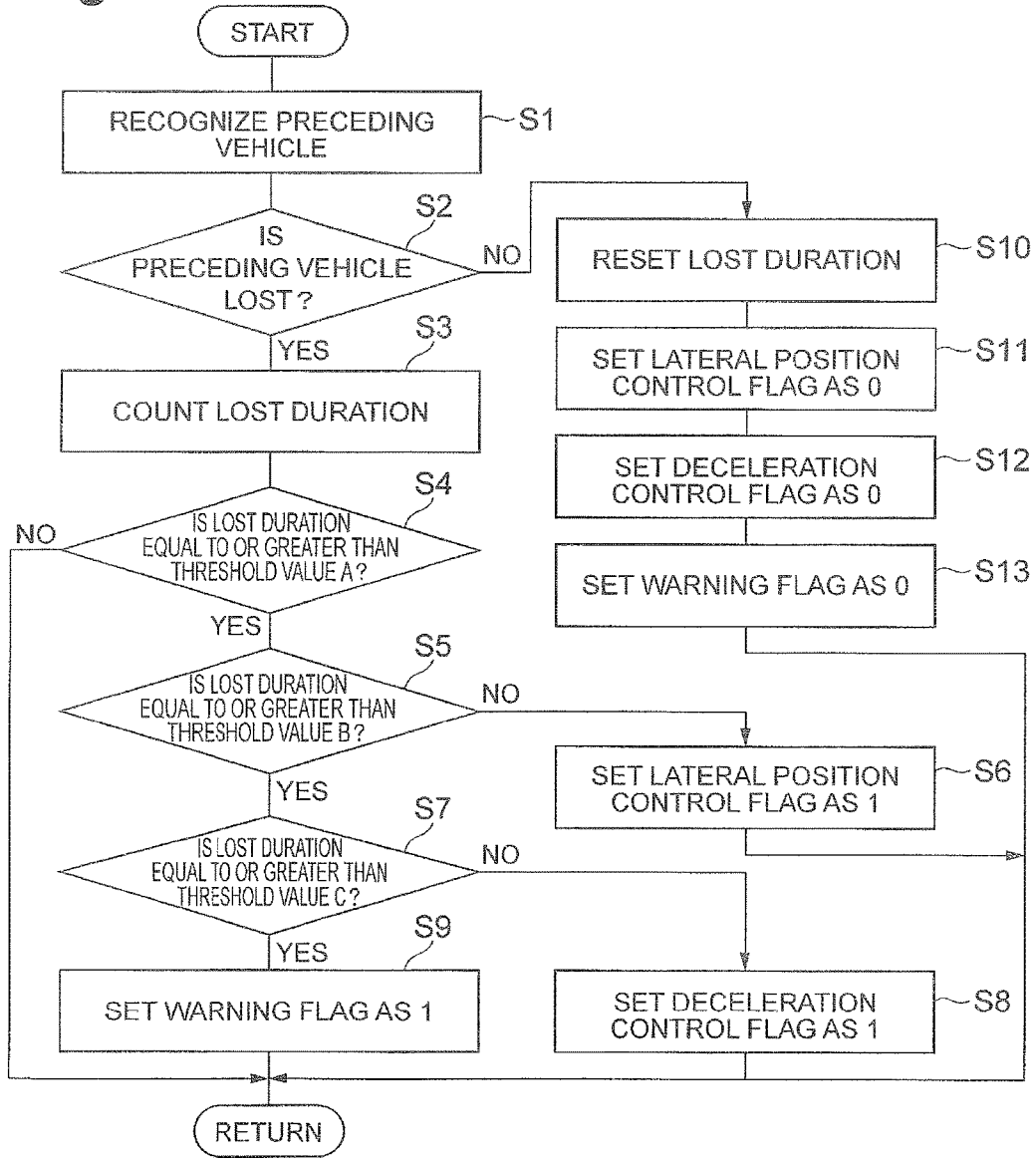
FIG. 3B is a flowchart illustrating processing in an ECU of the vehicle travelling control device illustrated in FIG. 1.

FIG. 3B is a flowchart illustrating processing in the ECU 10 of the vehicle travelling control device 100. In the vehicle travelling control device 100, when the vehicle V is caused to automatically travel in the travelling lane 31 based on the travel plan, that is, the actuator 6 is controlled based on the standard steering pattern and the vehicle V is caused to automatically travel along the target lateral position and the actuator 6 is controlled based on the standard speed pattern and the vehicle V is caused to automatically travel at the target vehicle speed, the following processing tasks are repeatedly executed in a predetermined processing period in the ECU 10.

First, the position of the preceding vehicle T on the adjacent lane 32 is recognized by the preceding vehicle recognition unit 11 based on the detection result of the peripheral monitoring sensor 1 (S1). A lost determination of whether or not the recognized position of the preceding vehicle T is lost is performed by the lost determination unit 11a (S2). In a case of YES in S2, the lost duration calculation unit 12 measures the lost duration (S3). The lost duration calculation unit 12 determines whether or not the lost duration is equal to or greater than the threshold value A (S4).

In a case of YES in S4, the lost duration calculation unit 12 determines whether or not the lost duration is equal to or greater than the threshold value B (S5). In a case of NO in S5, the lost duration calculation unit 12 sets the lateral position control flag as 1 and outputs the lateral position control flag to the travel control unit 14 (S6). In a case of YES in S5, the lost duration calculation unit 12 determines whether or not the lost duration is equal to or greater than the threshold value C (S7). In a case of NO in S7, the lost duration calculation unit 12 sets the deceleration control flag as 1 and outputs the deceleration control flag to the travel control unit 14 (S8). In a case of YES in S7, the lost duration calculation unit 12 sets the warning flag as 1 and outputs the warning flag to the HMI control unit 15 (S9).

On the other hand, in a case of NO in S2, the lost duration calculation unit 12 resets the lost duration (S10). The lost duration calculation unit 12 sets the lateral position control flag as 0 and outputs the lateral position control flag to the travel control unit 14 (S11). The lost duration calculation unit 12 sets the deceleration control flag as 0 and outputs the deceleration control flag to the travel control unit 14 (S12). The lost duration calculation unit 12 sets the warning flag as 0 and outputs the warning flag to the HMI control unit 15 (S13). Each processing in S10 to S13 may be executed in any order. In a case of NO in S4, after S6, after S8, and after S13, the process proceeds to the processing of the next period.

FIG. 4A is a flowchart illustrating the steering control processing by the travel control unit 14 of the ECU 10. In the travel control unit 14, following steering control processing is repeatedly executed in a predetermined processing period during the automatic travelling of the vehicle V.

It is determined whether or not the lateral position control flag is 1 (S21). In a case of NO in S21, the actuator 6 is controlled based on the standard steering pattern and the vehicle V is caused to automatically travel along the target lateral position (S22). In a case of YES in S21, the lateral position control unit 14a controls the actuator 6 based on the steering pattern at the separated lateral position, and causes the vehicle V to automatically travel along the separated lateral position (S23). After S22 or S23, the process proceeds to the processing of next period.

FIG. 4B is a flowchart illustrating the vehicle speed control processing by the travel control unit 14 of the ECU 10. In the travel control unit 14, following vehicle speed control processing is repeatedly executed in a predetermined processing period during the automatic travelling of the vehicle V.

It is determined whether or not the deceleration control flag is 1 (S31). In a case of NO in S31, the actuator 6 is controlled based on the standard speed pattern and the vehicle V is caused to automatically travel at the target vehicle speed (S32). In a case of YES in S31, the deceleration control unit 14b controls the actuator 6 based on the decelerated vehicle speed pattern, and causes the vehicle V to automatically travel at the vehicle speed decelerated from the target vehicle speed (S33). After S32 or S33, the process proceeds to the processing of next period.

FIG. 4C is a flowchart illustrating the warning processing by the HMI control unit 15 of the ECU 10. In the HMI control unit 15, following warning processing is repeatedly executed in a predetermined processing period during the automatic travelling of the vehicle V.

It is determined whether or not the warning flag is 1 (S41). In the case of NO in S41, the warning is stopped from being output from the HMI 5 (S42). Specifically, when the warning is not output from the HMI 5, the state is maintained, and when the warning is output, the warning is stopped from being output. In a case of YES in S41, the warning is output from the HMI 5 (S43). Specifically, when the warning is output from the HMI 5, the state is maintained, and when the warning is not output from the HMI 5, the warning is started to be output. After S42 or S43, the process proceeds to the processing of next period.

As described above, in the vehicle travelling control device 100 in the present embodiment, in a case where the lost duration reaches the threshold value A during the automatic travelling of the vehicle V, the lateral position control is executed which causes the vehicle V to automatically travel along the separated lateral position at the opposite side of the adjacent lane 32 side on which the lost preceding vehicle T travels, and then, the lateral position of the vehicle V is moved to the side opposite to the adjacent lane 32 side. In this way, it is possible to decrease the possibility of a collision with the lost preceding vehicle T. The movement of the lateral position can be realized without decelerating the vehicle V. In this way, an adverse influence to the travel of the following vehicle can be suppressed, and it is possible to decrease the possibility of causing the traffic congestion. In addition, it is possible to suppress the deterioration of fuel consumption economy.

In the vehicle travelling control device 100, in a case where the lost duration reaches the threshold value C during the automatic travelling of the vehicle V, the warning is output from the HMI 5. In a case where the lost duration reaches the threshold value C, it is possible to give warning to the driver to switch the automatic travelling to manual travelling.

In the vehicle travelling control device 100, when the warning is output from the HMI 5, the lateral position control is executed and the vehicle V travels along the separated lateral position (close to the white line 31a). At this point, in the present embodiment, as described above, The HMI 5 outputs the warning to urge the lateral position of the vehicle V be returned to the center of the travelling lane 31 in the lane width direction. In this way, it is possible to output the warning according to the lateral position control. In the vehicle travelling control device 100, the warning may be output from the HMI 5 by the HMI control unit 15 from the time when the lateral position control starts.

In the vehicle travelling control device 100, due to the lateral position control, it is possible to prevent the adverse influence from affecting another peripheral vehicle and to wait for the preceding vehicle T to return from the lost state (recognize the position of the preceding vehicle T again). In the vehicle travelling control device 100, even in a case where the accuracy of recognizing the preceding vehicle T is low, it is possible to maintain the lane position by moving close to the white line 31a.

In the vehicle travelling control device 100, it is possible to further secure the relative distance to the lost preceding vehicle T by combining the lateral position control and the deceleration control. In the vehicle travelling control device 100, since the deceleration control is not immediately performed but performed after the lateral position control, it is possible to suppress the execution of the deceleration control.

When the vehicle V travels on the express way, since the vehicle width of the vehicle V is generally 1.8 m while the lane width of the express way is 3.5 m to 3.75 m, there is an interval of 0.85 m to 0.90 m between the white line of the travelling lane 31 and the vehicle V. In the vehicle travelling control device 100, the lateral position control is executed using this interval, and the possibility of collision with the lost preceding vehicle T can be decreased.

Figure 5B:
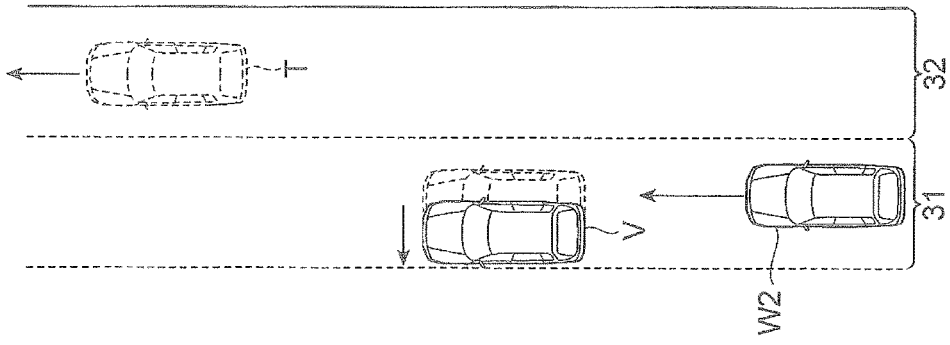
FIG. 5B is an overhead view explaining another modification example of the vehicle travelling control device illustrated in FIG. 1.
Figure 5A:
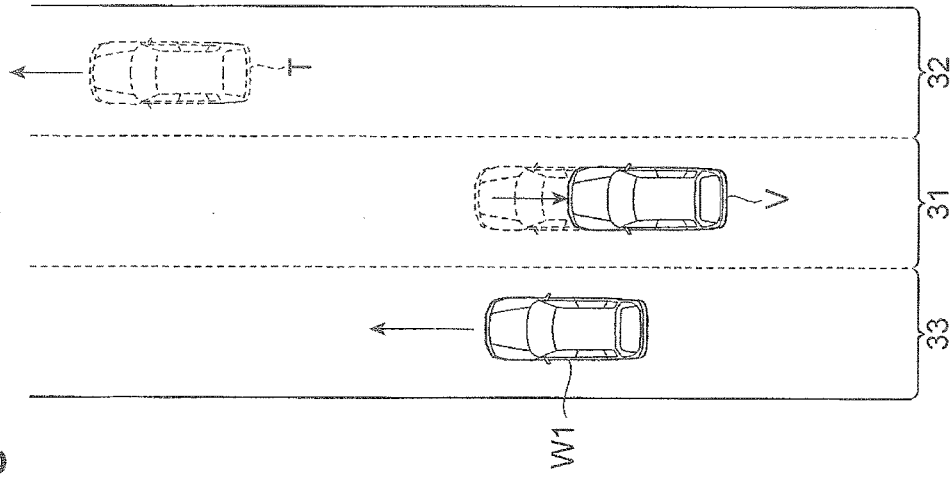
FIG. 5A is an overhead view explaining a modification example of the vehicle travelling control device illustrated in FIG. 1.

FIG. 5A is an overhead view explaining a modification example of the vehicle travelling control device 100. As illustrated in FIG. 5A, in the vehicle travelling control device 100, on another adjacent lane 33 on the opposite side of the adjacent lane 32 on which the lost preceding vehicle T exists, when another vehicle W1 exists on the side of the vehicle V, the lateral position control may not be executed. In this case, for example, in the vehicle travelling control device 100, it is determined whether or not another vehicle W1 exists on the side of the vehicle V on another adjacent lane 33 on the opposite side of the adjacent lane 32 on which the preceding vehicle T travels based on the detection result of the peripheral monitoring sensor 1. In a case where it is determined that another vehicle W1 exists, the lost duration calculation unit 12 sets the lateral position control flag as 0, and outputs the lateral position control flag to the travel control unit 14.

FIG. 5B is an overhead view explaining another modification example of the vehicle travelling control device 100. As illustrated in FIG. 5B, in the vehicle travelling control device 100, when a following vehicle W2 exists on the travelling lane 31 on which the vehicle V travels, the deceleration control may not be executed. In this case, for example, in the vehicle travelling control device 100, it is determined whether or not the following vehicle W2 exists on the travelling lane 31 within a predetermined range set in advance on the rear side of the vehicle V based on the detection result of the peripheral monitoring sensor 1. In a case where it is determined that the following vehicle W2 exists, the lost duration calculation unit 12 sets the deceleration control flag as 0, and outputs the deceleration control flag to the travel control unit 14.

Second Embodiment

Next, a second embodiment will be described. In the description in the present embodiment, a point different from the first embodiment will be described.

Figure 7:
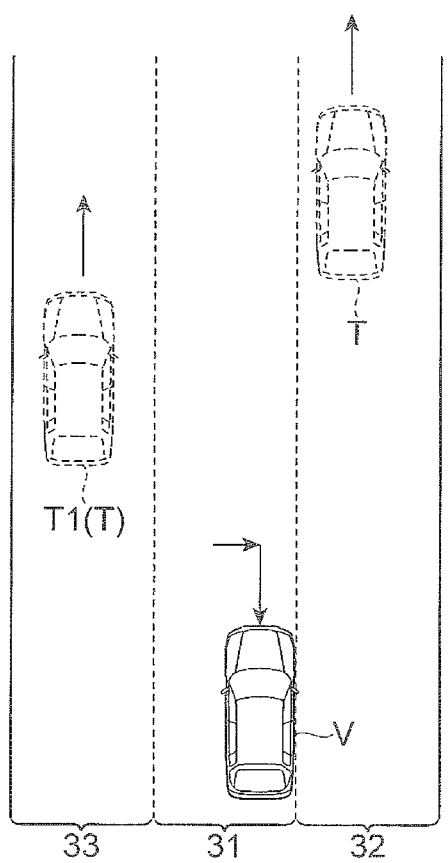
FIG. 7 is an overhead view explaining the vehicle travelling control device illustrated in FIG. 6.

FIG. 6 is a block diagram illustrating a configuration of a vehicle travelling control device 200. FIG. 7 is an overhead view explaining the vehicle travelling control device 200. FIG. 8 is a flowchart illustrating processing in the ECU 10 of the vehicle travelling control device 200. As illustrated in FIG. 6, the vehicle travelling control device 200 in the present embodiment is different from the vehicle travelling control device 100 in the first embodiment in a point that the preceding vehicle recognition unit 11 further includes a lost preceding vehicle selection unit 11b.

As illustrated in FIG. 6 and FIG. 7, the preceding vehicle recognition unit 11 recognizes the position, the vehicle speed, and the acceleration of a plurality of preceding vehicles T traveling on at least any one of the adjacent lane 32 and another adjacent lane 33 on the opposite side of the adjacent lane 32 based on the detection result of the peripheral monitoring sensor 1. The lost determination unit 11a performs the lost determination on the plurality of preceding vehicles T, and in a case where it is determined that the positions of one or a plurality of preceding vehicles T are lost, then, outputs the lost signal to the lost duration calculation unit 12.

In a case where it is determined by the lost determination unit 11a that the positions of one or a plurality of preceding vehicles T are lost, the lost preceding vehicle selection unit 11b selects one lost preceding vehicle T1 (hereinafter, referred to as "lost preceding vehicle T1") among the plurality of lost preceding vehicles T. For example, the lost preceding vehicle selection unit 11b selects the lost preceding vehicle T which has the highest possibility of collision from the plurality of lost preceding vehicles T, as the lost preceding vehicle T1. From the plurality of lost preceding vehicles T, the lost preceding vehicle selection unit 11b here selects the preceding vehicle T which has the largest multiplication value in which the relative distance to the vehicle V and the vehicle width of the preceding vehicle T, as the lost preceding vehicle T1.

The vehicle width of the preceding vehicle T is recognized based on the detection result of the peripheral monitoring sensor 1. The lost determination unit 11a outputs the position, the vehicle speed, the acceleration, and the travelling direction to the travel control unit 14 immediately before the lost in the lost preceding vehicle T1 selected by the lost preceding vehicle selection unit 11b.

In a case where the lateral position control flag output from the lost duration calculation unit 12 is 1, the lateral position control unit 14a of the travel control unit 14 performs the lateral position control for causing the vehicle V to automatically travel along the separated lateral position separated from the target lateral position on the opposite side of the adjacent lane 33 on which the lost preceding vehicle T1 selected by the lost preceding vehicle selection unit 11b.

In a case where the deceleration control flag output from the lost duration calculation unit 12 is 1, the deceleration control unit 14b of the travel control unit 14 performs the deceleration control for causing the vehicle V to automatically travel at the vehicle speed which is decelerated from the target vehicle speed such that the vehicle-to-vehicle distance between the vehicle V and the lost preceding vehicle T1 selected by the lost preceding vehicle selection unit 11b is enlarged.

Next, the processing tasks executed in the vehicle travelling control device 200 will be described with reference to the flowchart in FIG. 8. After the lost determination by the lost determination unit 11a (after S2), the lost preceding vehicle selection unit 11b determines whether or not the position of a plurality of preceding vehicles T is lost (S51). In a case of YES in S51, one lost preceding vehicle T1 is selected from the plurality of lost preceding vehicles T (S52). In a case NO in S51 or after S52, the process proceeds to S3 in which the lost duration calculation unit 12 counts the lost duration.

As described above, in the vehicle travelling control device 200 in the present embodiment as well, the possibility of collision with the preceding vehicle T can be decreased, and thus, it is possible to achieve the above-described effect of decreasing the possibility of causing the traffic congestion. In the vehicle travelling control device 200, using the lost preceding vehicle selection unit 11b, it is possible to correspond to the case where the lost determination unit 11a determines that the position of the plurality of lost preceding vehicles T is lost.

As described above, embodiments of the present invention is described. However, the present invention is not limited to the embodiments described above and can be embodied in various aspects. In the embodiments described above, a part of the functions of the ECU 10, that is, parts of the functions of the preceding vehicle recognition unit 11, the lost determination unit 11a, the lost preceding vehicle selection unit 11b, the lost duration calculation unit 12, the travel plan generation unit 13, the travel control unit 14, the lateral position control unit 14a, the deceleration control unit 14b, and the HMI control unit 15 may be executed by a computer in the facility such as an information processing center which is capable of communicating with the vehicle V.

According to the present invention, it is possible to provide a vehicle travelling control device in which the possibility of collision with the preceding vehicle can be decreased and the possibility of causing traffic congestion can be decreased.

What is claimed is:

1. A vehicle travelling control device configured to cause a vehicle to automatically travel along a target lateral position set in a travelling lane in advance, the device comprising:
   a peripheral information detection unit configured to detect peripheral information of the vehicle;
   a preceding vehicle recognition unit configured to recognize a position of a preceding vehicle in an adjacent lane which is adjacent to the travelling lane; and
   a travel control unit configured to cause the vehicle to automatically travel along a separated lateral position which is separated from the target lateral position at the opposite side of the adjacent lane side in a case where a lost duration that is a continuous period of time during which the position of the preceding vehicle is lost in the preceding vehicle recognition unit reaches a first predetermined time.

2. The vehicle travelling control device according to claim 1, further comprising:
   a warning unit configured to output a warning to a driver of the vehicle to switch from the automatic travelling to a manual travelling in a case where the lost duration reaches a second predetermined time which is longer than the first predetermined time during the automatic travelling of the vehicle.

3. A vehicle travelling control device configured to cause a vehicle to automatically travel along a target lateral position set in a travelling lane in advance, the device comprising:
   a peripheral information sensor configured to detect peripheral information of the vehicle; and
   an ECU configured to:
   recognize a position of a preceding vehicle in an adjacent lane which is adjacent to the travelling lane; and
   cause the vehicle to automatically travel along a separated lateral position which is separated from the target lateral position at the opposite side of the adjacent lane side in a case where a lost duration that is a continuous period of time during which the position of the preceding vehicle is lost reaches a first predetermined time.

* * * * *